US012768211B2

(12) United States Patent
Goodchild et al.

(10) Patent No.: US 12,768,211 B2
(45) Date of Patent: Oct. 20, 2026

(54) CONTROL SYSTEM FOR A VEHICLE

(71) Applicant: JAGUAR LAND ROVER LIMITED, Coventry (GB)

(72) Inventors: Samuel Goodchild, Coventry (GB); Steven Thomas, Coventry (GB); Bastien Cagnac, Coventry (GB); Luke Sanders, Coventry (GB); Zhou Xu, Coventry (GB); Sean Edwards, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 214 days.

(21) Appl. No.: 17/995,796

(22) PCT Filed: Apr. 2, 2021

(86) PCT No.: PCT/EP2021/058812
§ 371 (c)(1),
(2) Date: Oct. 7, 2022

(87) PCT Pub. No.: WO2021/204728
PCT Pub. Date: Oct. 14, 2021

(65) Prior Publication Data

US 2023/0160250 A1 May 25, 2023

(30) Foreign Application Priority Data

Apr. 9, 2020 (GB) ...................................... 2005306

(51) Int. Cl.
*E05F 15/40* (2015.01)
*B60J 5/04* (2006.01)

(52) U.S. Cl.
CPC ............... *E05F 15/40* (2015.01); *B60J 5/047* (2013.01); *E05Y 2201/25* (2013.01);
(Continued)

(58) Field of Classification Search
CPC ....... E05F 15/40; B60J 5/047; E05Y 2201/25; E05Y 2400/44; E05Y 2400/54; E05Y 2900/531
(Continued)

(56) References Cited

U.S. PATENT DOCUMENTS 7,586,402 B2 * 9/2009 Bihler ...................... E05B 77/12 49/31
11,518,400 B2 * 12/2022 Langbein .............. B60W 50/14
(Continued)

FOREIGN PATENT DOCUMENTS

CN 106246030 A 12/2016
CN 107083894 A 8/2017
(Continued)

OTHER PUBLICATIONS

Great Britain Intellectual Property Office, Combined Search and Examination Report under Sections 17 and 18(3) Issued in Application No. GB2005306.2, Jan. 26, 2021, 7 pages.
(Continued)

*Primary Examiner* — Matthias S Weisfeld
(74) *Attorney, Agent, or Firm* — McCoy Russell LLP

(57) ABSTRACT

A control system for controlling vehicle door movement along a door sweep trajectory between a first position and a second position can include one or more controllers, the control system configured to: receive a sensor signal; based on the sensor signal, generate an obstacle detection map of a sensor region in the vicinity of the vehicle, the obstacle detection map comprising a location of an obstacle if present; determine an overlap of the obstacle detection map and a projected door sweep region defined by the door sweep trajectory; and generate an output signal based on the determined overlap.

15 Claims, 4 Drawing Sheets

(52) U.S. Cl.
CPC ..... *E05Y 2400/44* (2013.01); *E05Y 2400/446* (2024.05); *E05Y 2400/54* (2013.01); *E05Y 2900/531* (2013.01)

(58) Field of Classification Search
USPC ........................................................... 701/49
See application file for complete search history.

(56) References Cited

U.S. PATENT DOCUMENTS

| | | | | |
|---|---|---|---|---|
| 2005/0280518 | A1 * | 12/2005 | Bartels | B60Q 9/008 340/691.3 |
| 2009/0033477 | A1 * | 2/2009 | Illium | E05C 17/00 280/727 |
| 2011/0295469 | A1 | 12/2011 | Rafii et al. | |
| 2017/0185763 | A1 | 6/2017 | Jeromin et al. | |
| 2017/0247933 | A1 * | 8/2017 | Elie | G01K 3/005 |
| 2017/0334353 | A1 | 11/2017 | Gillott et al. | |
| 2018/0044963 | A1 * | 2/2018 | Gómez Melchor | E05F 5/00 |
| 2018/0308464 | A1 * | 10/2018 | Kupfernagel | G01S 7/521 |
| 2019/0112849 | A1 * | 4/2019 | Cumbo | E05C 17/003 |
| 2020/0262275 | A1 * | 8/2020 | Jeon | B60J 5/0443 |

FOREIGN PATENT DOCUMENTS

| | | | | |
|---|---|---|---|---|
| CN | 107298067 | A * | 10/2017 | G08G 1/165 |
| DE | 102008036009 | A1 | 10/2009 | |
| DE | 102011079003 | A1 | 1/2013 | |
| DE | 102012005828 | A1 | 9/2013 | |
| DE | 102012014939 | A1 | 1/2014 | |
| DE | 202015003104 | U1 | 7/2015 | |
| KR | 20140145424 | A | 12/2014 | |

OTHER PUBLICATIONS

ISA European Patent Office, International Search Report and Written Opinion Issued in Application No. PCT/EP2021/058812, Jun. 22, 2021, WIPO, 13 pages.

Great Britain Intellectual Property Office, Examination Report under Section 18(3) Issued in Application No. GB2005306.2, Jun. 7, 2022, 5 pages.

European Patent Office, Office Action Issued in Application No. 21717797.1, Apr. 25, 2024, Netherlands, 5 pages.

* cited by examiner

CONTROL SYSTEM FOR A VEHICLE

CROSS REFERENCE TO RELATED APPLICATIONS

The present application is a U.S. National Phase of International Application No. PCT/EP2021/058812 entitled "CONTROL SYSTEM FOR A VEHICLE," and filed on Apr. 2, 2021. International Application No. PCT/EP2021/058812 claims priority to Great Britain Patent Application No. 2005306.2 filed on Apr. 9, 2020. The entire contents of each of the above-listed applications are hereby incorporated by reference for all purposes.

TECHNICAL FIELD

The present disclosure relates to a control system for a vehicle. Aspects of the invention relate to a control system, to a method and to a vehicle.

BACKGROUND AND SUMMARY

It is known to provide side doors on a vehicle with a power assist system to aid the opening and closing of the doors. Some doors on vehicles are of a slidable nature and others are of a hinged nature. The invention relates to a hinged door on a vehicle.

In some known vehicle door arrangements, moderate engagement by the user of a handle associated with the door will activate powered opening of the door, and a full engagement will actuate the door manually. Powered doors systems add a sophisticated feel to the door opening experience for the user and reduce user effort in manoeuvring the door between open and closed positions.

One problem which has been addressed in the prior art is that of obstacles in the path of the door which may impact on door movement. Obstacle detection systems on power assist systems for vehicle doors are known and typically operate to interrupt the opening (or closing) movement of the door in the event that an obstacle is detected in the path of door movement.

One conventional obstacle detection system on a power assisted door relies on the use of ultrasonic sensors to detect the presence of an obstacle in the vicinity of the door throughout door movement. The sensors are typically hidden behind the door panel so that the profile of the vehicle is not disturbed by unsightly mountings. However, such systems provide limited or reduced coverage, especially because the material of the door provides a degree of absorption for ultrasound radiation which causes anomalies in signal strength and it is therefore difficult to balance aesthetic requirements with the need for good technical functionality. In addition, the provision of additional sensors on the door only adds to the overall vehicle cost, which for certain classes of vehicle provides a prohibitive solution for manufacture.

It is one aim of the present invention to at least address the disadvantages associated with the prior art.

According to an aspect of the present invention there is provided a control system for controlling vehicle door movement along a door sweep trajectory between a first position and a second position, the control system comprising one or more controllers, the control system configured to: receive a sensor signal; based on the sensor signal, generate an obstacle detection map of a sensor region in the vicinity of the vehicle, the obstacle detection map comprising a location of an obstacle, if present, determine an overlap of the obstacle detection map and a projected door sweep region defined by the door sweep trajectory, and generate an output signal based on the determined overlap.

By generating the obstacle detection map, including the location of the obstacle if present, and determining the overlap of the obstacle detection map and the door sweep trajectory, an accurate and convenient determination can be made regarding whether or not there is a correspondence between the opening (or closing) door and the obstacle to warrant some action being taken, in response, so as to prevent a collision between the door and the obstacle.

The invention provides a further advantage that door movement can be controlled, by way of the output signal, to avoid a clash between the door and an obstacle in its path. The output signal can be generated before door movement occurs, for example to avoid the door opening onto an obstacle in the immediate vicinity of the door, or may be generated during door movement along a trajectory.

In an embodiment, the one or more controllers collectively comprise: at least one electronic processor having an electrical input for receiving the sensor signal; and at least one memory device electrically coupled to the at least one electronic processor and having instructions stored therein; and wherein the at least one electronic processor is configured to access the at least one memory device and execute the instructions thereon so as to perform the determining the location of the obstacle, the generating the obstacle detection map, the determining the overlap and the generating the output signal.

The control system may be configured to determine a presence of an obstacle in dependence on the sensor signal, wherein the obstacle detection map comprises the location of the obstacle.

The control system may be configured to generate the output signal based on both the determined overlap and the location of the obstacle.

The control system may be configured to generate the output signal in the form of a clash output signal when the location of the obstacle is within the projected door sweep region.

In an alternative embodiment, the control system is configured to generate the output signal when there is no correspondence between the location of the obstacle and the projected door sweep region so that door movement would not be intercepted by the obstacle.

In embodiments, the output signal is generated in the form of (or is used to generate another output in the form of) a maximum angle of door opening relative to the vehicle that avoids a clash occurring with the object. In other embodiments, the output signal is generated in the form of (or is used to generate another output in the form of) a maximum distance separating the door and an obstacle. At least one of the maximum angle of door opening and the maximum distance may be used to control further door movement so as to limit the extent of door opening (or closing) to avoid a clash with an obstacle.

The control system may be configured to provide the output signal prior to the door being moved from the first position toward the second position.

By providing the output signal prior to the door being moved, door movement can be automatically inhibited to prevent a door clash with an object, or a user can be alerted to the likelihood of a door clash with the object, prior to opening.

The control system may be configured to generate the output signal to control door movement so as to limit an extent of the door movement in dependence on the location of the obstacle.

By way of example, the control system may be configured to generate the output signal to limit the extent of the door movement to an initial portion of the door sweep trajectory to avoid the door clashing with a detected obstacle. For example, the control system may be configured to generate the output signal to dampen the door movement.

The control system may, for example, be configured to output a damping signal to increase a level of damping of the door as the door approaches the location of the obstacle.

The control system may be configured to dampen the door movement by generating the output signal to adjust a force required for manually actuating the door.

The force required for manually realising the door movement may vary along the door sweep trajectory, and the control system may be configured to increase the force required for manually realising the door movement when approaching the location of the obstacle.

The sensor signal may comprise information representative of a pitch angle and/or roll angle of the vehicle.

The control system may be configured to control a force required to hold the door in a fixed position based on the pitch angle and/or roll of the vehicle.

In one embodiment, the obstacle detection map comprises an array of elements, each of which has an associated maximum door opening or closing angle which represents a maximum extent of opening or closing movement, respectively, of the door depending on the location of the object, if present.

In accordance with another aspect of the invention, there is provided a method for, in a vehicle, controlling vehicle door movement along a door sweep trajectory between a first position and a second position, the control system comprising one or more controllers, the method comprising receiving a sensor signal; based on the sensor signal, generating an obstacle detection map of a sensor region in a vicinity of the vehicle, the obstacle detection map comprising a location of an obstacle if present, determining an overlap of the obstacle detection map and a projected door sweep region defined by the door sweep trajectory, and generating an output signal based on the determined overlap.

The method may comprise determining a location of an obstacle in a sensor region in the vicinity of the vehicle, the obstacle detection map comprising the location of the obstacle.

The method may comprise generating the output signal based on both the location of the obstacle and the determined overlap.

In accordance with another aspect of the invention, there is provided a vehicle comprising at least one door and the control system of a previous aspect of the invention for controlling movement of the door along the door sweep trajectory, the vehicle comprising a sensor assembly, operatively coupled to the control system for providing the sensor output thereto, and at least one door actuator, operatively coupled to the control system for controlling movement of the door based on the output signal.

In the vehicle, ultrasonic sensors may be mounted behind a trim of the vehicle that has good transmission of ultrasonic signals so as to ensure accurate and reliable detection of obstacles. Utilising sensors on the vehicle door and/or on the corners of the vehicle provides advantages, especially if the sensors are suitable for other purposes too (for example, parking sensors or wade sensors).

In embodiments, the sensor assembly may comprise an ultrasonic sensor and/or a wade sensor.

The sensor assembly may comprise at least two door sensors, mounted to the door. For example, the at least two door sensors may be ultrasonic sensors mounted within a trim panel of the door.

The trim panel may take the form of a plastic strip trim panel, for example located near a lower edge of the door.

The sensor assembly may comprise at least one corner sensor mounted to the vehicle on at least one of a front corner and a rear corner of the vehicle. For example, a front corner sensor and a rear corner sensor may be provided in the same side of the vehicle. The corner sensors may be radar sensors and may be used to characterise or classify the obstacles within the obstacle detection map.

Other forms of sensors (e.g. cameras) may be used for obstacle/object classification.

In accordance with another aspect of the invention, there is provided computer software that, when executed, is arranged to perform a method according to a previous aspect of the invention.

In accordance with another aspect of the invention, there is provided a non-transitory, computer-readable storage medium storing instructions thereon that, when executed by one or more electronic processors, causes the one or more electronic processors to carry out the method of a previous aspect of the invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

For purposes of this disclosure, it is to be understood that the control system described herein may comprise a control unit or computational device having one or more electronic processors. The vehicle and/or a system thereof may comprise a single control module or electronic controller or alternatively different functions of the controller(s) may be embodied in, or hosted in, different control modules or controllers.

As used herein, the terms 'controller' or 'control module' will be understood to include both a single control module or controller and a plurality of control modules or controllers collectively operating to provide the required control functionality. A set of instructions could be provided which, when executed, cause said control modules(s) to implement the control techniques described herein (including the method(s) described below). The set of instructions may be embedded in one or more electronic CPU or processors.

Alternatively, the set of instructions could be provided as software to be executed by one or more electronic processor(s). For example, a first control module may be implemented in software run on one or more electronic processors, and one or more other control modules may also be implemented in software run on one or more electronic processors, optionally the same one or more processors as the first control module. It will be appreciated, however, that other arrangements are also useful, and therefore, the present invention is not intended to be limited to any particular arrangement.

In any event, the set of instructions described above may be embedded in a computer-readable storage medium (e.g. a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or electrical or other types of medium for storing such information/instructions.

A vehicle in accordance with an embodiment of the present invention, and including a control system of an embodiment of the invention, is described herein with reference to the accompanying FIGS. 1 to 6.

Figure 1:
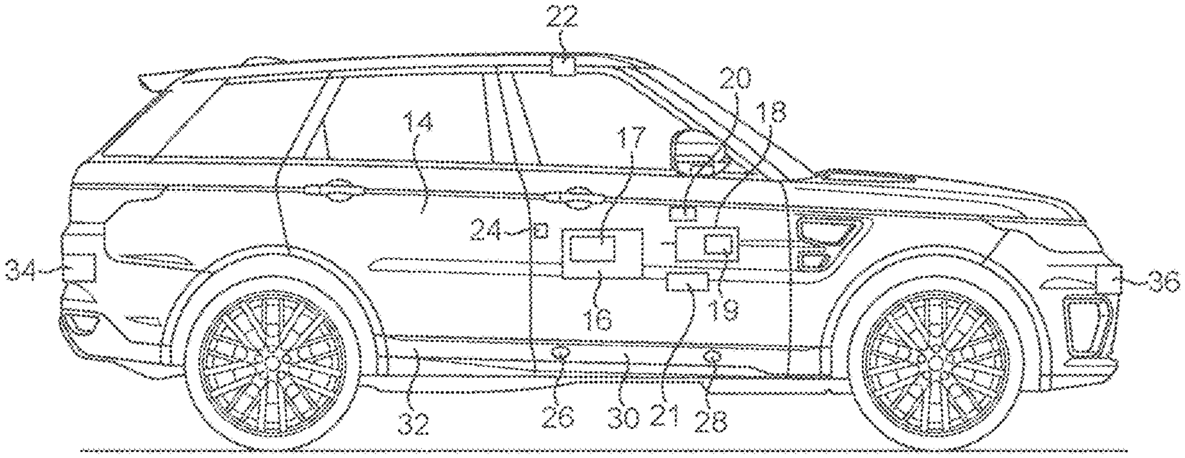
FIG. 1 shows a side view of a vehicle within which a control system of the invention may be implemented.

FIG. 1 shows a vehicle 10 having a power system for opening and closing at least one vehicle door 12, 14. The vehicle has two vertically-hinged side doors 12, 14 on one side of the vehicle and two identical vertically-hinged side doors (not visible) on the other side of the vehicle. For the purpose of the description of FIG. 1, the power system of only one of the doors (the front right vehicle door 12) will be described in detail. The door 12 is hingedly mounted to the vehicle body towards the front edge of the vehicle door. The door includes an internal release lever 21 in a conventional manner.

The power system for the door includes a power door controller or control unit 16, a power door unit 18 including a door actuator 19, and a user interface 20 to allow the user to operate various functions on the door, including door opening and closing sequences, door locks and wing mirror position, power door settings and the opening and closing of the tailgate and the bonnet. It will be understood that the user interface 20 may be provided with separate buttons to initiate opening and closing of the door. Alternatively, a single button may be provided to open the door if it is currently closed and to close the door if it is currently open. A stop button (not shown) may also be provided to stop the door movement if desired. The door actuator 19 is configured to apply a force to door to cause it to open or close about its hinges.

The system also includes first and second switches 22, 24, one switch 22 being mounted at the top of the door 12 and one switch 24 being mounted in an approximate mid-position of the rear edge of the door 12, remote from the front edge hinge. The switches 22, 24 are activated depending on whether the door 12 is opened or closed, and provide signals to the controller 16 to indicate whether the door is opened or closed.

The power system further includes first and second sensors 26, 28 mounted on the outer face of the vehicle door 12 towards its lower edge. The first sensor may be referred to as the front door sensor 28 of the door 12 and the second sensor may be referred to as the rear door sensor 26 of the front door. The sensors 26, 28 are ultrasonic sensors having a range of typically around 1.5 m. The sensors 26, 28 are mounted within a plastic trim 30 which extends from the front edge to the read edge of the door 12. The plastic trim 30 forms a continuous trim line with a corresponding plastic trim 32 on the rear door 14 with the sensors 26, 28 being arranged in an aesthetically sympathetic manner within the plastic trim 30.

The sensors 26, 28 may be similar to the sensors employed in a parking distance control system, and at least one of the sensors may also be used as part of a parking distance control system when the powered opening and closing system of the present invention is not in operation. The skilled person will understand that other sensors, for example radar sensors or one or more cameras in conjunction with an image processing module, may be used in addition to or instead of ultrasonic sensors.

Further sensors are provided on the vehicle: a first corner sensor 34 at the rear of the vehicle and a second corner sensor 36 at the front of the vehicle 10. Typically these sensors are radar sensors and are long range sensors with a range of around 50 metres horizontally and 3 metres vertically. These sensors are typically used on vehicles for the purpose of monitoring other vehicles around the vehicle when the vehicle is moving (i.e. blind spot monitoring sensors).

All of the sensors 26, 28 send output signals to the power door controller 16. The output signals are either sent directly from the sensors 26, 28 to the power door controller 16 or may be sent through an intermediary component of the power system.

Pitch and roll sensors (not shown) may also be included on the vehicle and provide signals to the power door controller 16. The pitch and roll sensors determine the pitch of the vehicle (i.e. the angle of the vehicle relative to its transverse axis) and the roll of the vehicle (i.e. the angle of the vehicle relative to its longitudinal axis), respectively, and hence provide signals representative of the pitch and roll values, respectively, to the controller 16.

The power door controller 16 includes an electronic memory (optionally a non-transitory computer readable media—not shown) and a processor 17. The electronic memory is in communication with the processor. The power door controller 16 is configured to control the actuator of the power door unit 16 to provide a variable drive to open or close the door 12. The power door unit 16 includes an actuator system including a drive motor for a main door shaft which is connected to the door and which moves when the door moves. A gear arrangement (typically in the form of a planetary gearbox) and a clutch are provided, with the clutch being used to disconnect the door from the drive motor and the gearbox. When the clutch is engaged the door can be driven or held in position. When the clutch is disengaged the door is able to move freely.

A different force is required from the actuator to open the vehicle door, depending on the pitch and roll of the vehicle, and the mass of the door and potentially other external factors such as the wind.

An additional door sensor (not shown), for example a Hall sensor, may be provided within the door actuator to measure the extension of the actuator, and therefore the angular position of the door relative to the rest of the vehicle. For example, when the door is wide open, the extension of the actuator is relatively high and a corresponding angular position is determined, based on the extension. If the door is closed, the actuator extension is at a minimum value and the corresponding angular position is determined to be zero. In this way a determination can be made continuously about the instantaneous angular position of the door through an opening (or closing) door sequence.

The output from the additional door sensor may be provided to the processor of the controller 16 so that the processor receives a continuous signal relating to the angular position of the door.

The skilled person will understand that the use of a linear actuator to control the door, and this form of angular position measurement system, is merely an example of one way of monitoring door movement, and that various other types of actuator would also be suitable, including but not limited to one or more electric motors configured to apply a torque at the hinge, a hydraulic linear actuator configured to apply a force to the door, or a pulley system configured to apply a force to the door. If an actuator is provided that does not include a sensor that is able to directly or indirectly measure the position of the door relative to the rest of the vehicle then a separate sensor (not shown) may be provided to measure the position of the door.

A wade sensor may also be provided on an underside of the vehicle wing mirror (one on each side of the vehicle). The wade sensor is used to monitor the wading depth of the vehicle when moving through water. An output signal from the wade sensor is provided to the power door controller 16 so that powered operation of the door 14 can be prevented if the water is at a depth which would enter the vehicle cabin if the door was opened.

The user interface 20 is configured to receive an instruction from a user to open or close the door. For example, with the door closed and the user inside the vehicle, the user interface 20 may be operated by means of the user touching a button to indicate that the door should be opened from the closed position. The power control unit 18 may be hardwired to the power door controller 16, or may communicate with the controller 16 through a wireless signal, for example a short wave radio signal. Various user interfaces would be suitable for use in controlling door operation, including but not limited to one or more dedicated switches on the dashboard of the vehicle, one or more soft keys in a vehicle Human-Machine Interface (HMI), a voice command, or one or more switches on the inner and/or outer part of the door.

In general terms, on receipt of an instruction from the user interface 20 to open or close the door the control unit 18 is configured to initiate an appropriate door opening or closing sequence, according to the instruction. The door opening or closing sequence comprises checking for objects in the expected trajectory of the door (referred to as the door sweep trajectory) using information derived from the sensors 26, 28, 34, 36. All of the sensors may be used to detect obstacles in a sensor region in the vicinity of the vehicle, or only some of the sensors. For example, in some embodiments only the door sensors 26, 28 may be used to detect obstacles in the region adjacent to the vehicle.

The door sweep trajectory is checked for obstacles before the door 12 is initially moved and is continuously monitored while the door is being opened or closed. If an obstacle is detected in the door sweep trajectory at any point before or during the opening or closing of the door, the door actuator may be controlled to bring the door to rest and to stop the sequence.

In some embodiments, it is a particular advantage of the invention that the detection of an obstacle in the path of the door occurs prior to door movement being initiated.

If no obstacles are detected in the expected path of the door 12 then the control unit is configured to control the actuator through a drive profile to provide an appropriate force to open or close the door in accordance with the user instruction. The appropriate force to be provided by the actuator is determined in dependence on the measured values of the orientation of the vehicle about its pitch and roll axes and the overall mass of the door which is a known quantity stored in the controller memory. Typically, for example, the control unit 16 is configured to select a drive profile to initiate a door opening sequence based on the measured orientation of the vehicle and the overall mass of the door. A look up table relating the mass and orientation values to the appropriate drive profile may be stored in the electronic memory or any other suitable memory device.

A more detailed description of a method of controlling opening movement of the vehicle door in FIG. 1 will now be described, with reference to FIGS. 2, 3 and 4. For the purpose of the following description, the opening door sweep trajectory is defined as the path the door traverses in moving between its closed and open positions and the closing door sweep trajectory is defined as the path the door traverses in moving between its open and closed positions. The door sweep trajectory (whether opening or closing) defines a projected door sweep region which is the area between the door and the vehicle as the door sweeps through its (opening or closing) door sweep trajectory. The projected door sweep region has maximum coverage (referred to as the maximum projected door sweep region) when the door is fully open.

In this embodiment it is assumed that the door system is configured such that, upon receipt of a user instruction at the user interface 20, a door drive profile (stored in the memory of the controller) is sent to the power door unit 18 to cause the door to move between a first, door-closed position and a second door-open position. The door drive profile therefore comprises the appropriate door drive signal to move the door to the position determined by the user instruction at the user interface 20. For the purpose of the following description, the second door-open position is the fully open position of the door.

In response to the door drive profile, the vehicle door 12 follows a door sweep trajectory which moves the door away from the vehicle body towards its final door-open position (fully open door position) so that that door 12 defines an angle to the vehicle body.

When the door is in final door-open position (i.e. the maximum extent of opening according to the door drive profile), the projected door sweep region has maximum coverage to define the maximum projected door sweep region, as defined previously. The door sweep trajectory and the maximum projected door sweep region are used in the processing steps, which are described below.

Figure 2:
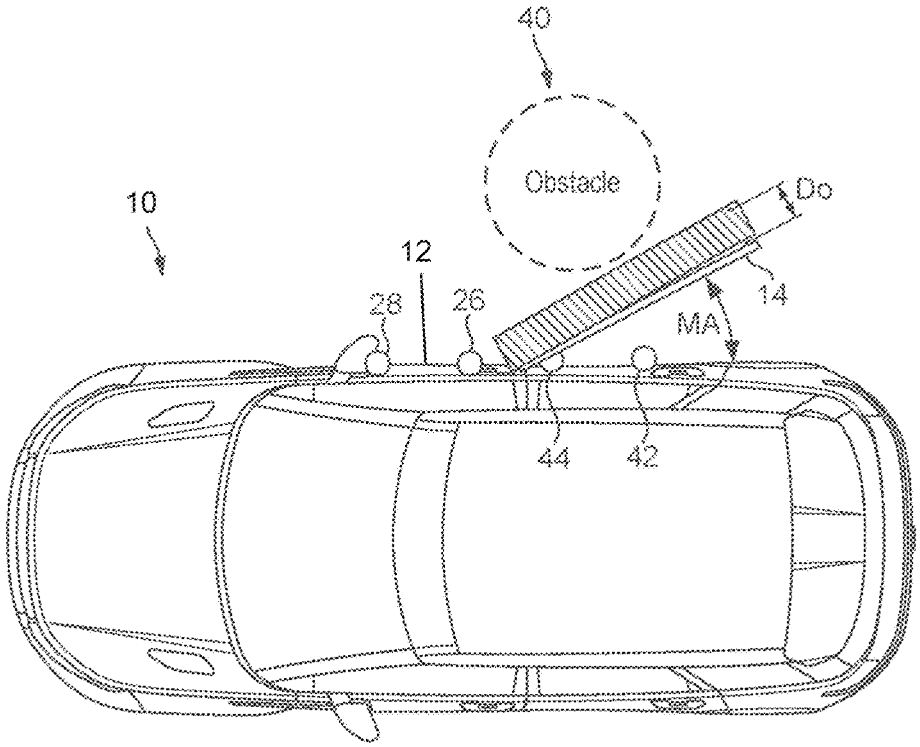
FIG. 2 shows a plan view of the vehicle in FIG. 1, to illustrate the opening of the door in the vicinity of an obstacle.

FIG. 2 shows a plan view of the vehicle 12 with the rear door 14 of the vehicle opening towards an obstacle 40 in the vicinity of the vehicle 12. The obstacle position is indicated by the dashed circular line and lies within an obstacle detection map (as described in further detail below) which is generated from the sensor outputs. It can be seen in FIG. 2 that there are four side door sensors on each side of the vehicle, two mounted on the back door 42, 44 and two mounted on the front door 26, 28 (as in FIG. 1). Regardless of which door of the vehicle is being opened, all four sensors may be used to detect the presence of any obstacles in the vicinity of the door. Front and rear corner sensors (as shown in FIG. 1) may also be used to detect obstacles in the vicinity of the opening door using longer range sensing.

The maximum extent to which the door 14 can be opened, before hitting the obstacle 40, is defined by a minimum distance-to-obstacle value (Do), measured as the shortest perpendicular distance between the door when it is brought to a halt and, for example, the closest point on the surface of the obstacle. In other words, the minim distance-to-obstacle value represents the closest separation permitted between the door and the obstacle. Typically, the minimum distance-to-obstacle value is around 20 to 25 centimetres, but in some embodiments may be as low as around 5 centimetres. A typical range for the minimum distance-to-obstacle value may be between 5 and 25 centimetres or between 10 and 20 centimetres. The minimum distance-to-obstacle value will depend on, for example, where the vehicle is parked and the nature of the obstacle. The minimum distance-to-obstacle value (Do) may be used to define a maximum door opening angle MA.

Figure 3:
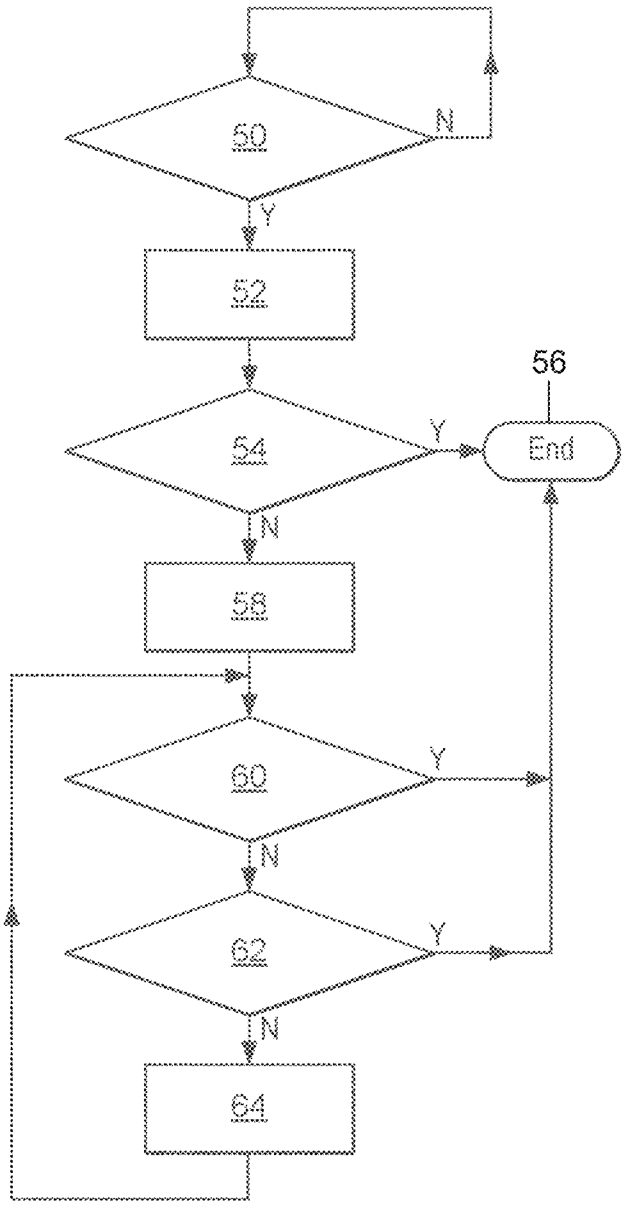
FIG. 3 shows a flow chart showing to illustrate one method of operating the control system of the vehicle in FIGS. 1 and 2.

FIG. 3 is a flow diagram to illustrate a door opening sequence in accordance with one embodiment of the present invention with the doors 12, 14 initially in the closed position. The opening sequence for one of the doors, 12 or 14, begins at step 50, at which point the control unit 18 waits to receive an "open" signal from the user interface 20. The control unit 18 may only initiate step 50 if the vehicle door is currently closed. Further conditions, for example the vehicle being stationary and/or a park setting of the powertrain/gearbox being enabled, may also be required to be met before the control unit 18 begins the opening sequence.

If a door open signal is received at step 50 the sequence proceeds to step 52, in which the control unit 18 reads the pitch and roll value from the respective sensors and selects a door drive profile on the basis of the user demand and the stored door mass. The drive door profiles are stored in the memory of the controller and are based on pre-calibrated data. Once the door drive profile is selected the control unit 18 checks for obstacles 40 in the maximum projected door sweep region at step 54. If a correspondence is determined between the maximum projected door sweep region and an obstacle location (i.e. if at least a part of an obstacle falls within the maximum projected door sweep region), an output signal is generated and the sequence immediately ends at step 56 without opening the door 12, 14. This output signal may be a clash output signal which provides an alert that a clash may be imminent unless some mitigation occurs.

If no obstacles are detected within the maximum projected door sweep region the sequence proceeds to step 58, in which opening of the door 12, 14 is initiated by sending a signal to the door actuator to drive the door in accordance with the appropriate drive profile. After door opening has been initiated the sequence proceeds to step 60, in which the controller again checks for obstacles within the maximum projected door sweep region, and then on to step 62 in which the controller checks whether the door 12, 14 is fully open, or not.

If it is detected that either there is a correspondence between the maximum projected door sweep region and an obstacle in the path of the door 12,14 during opening movement of the door, or that the door is fully open, an output signal is generated and the sequence stops movement of the door and ends at step 62.

If there is no correspondence and the door 12, 14 is not fully open, the sequence proceeds to step 64, in which the opening of the door 12, 14 is continued. The controller continues opening the door 12, 14 until either an obstacle is detected in step 60 or the door is determined to be fully open in step 62.

The way in which obstacle detection is implemented, using an obstacle detection map, and the way in which door movement is controlled as a result, will now be described in further detail in relation to FIG. 4.

The controller generates an obstacle detection map, referred to generally as 70, which covers a region in the vicinity of the vehicle (i.e. immediately adjacent to the side of the vehicle door 14), including the location of the obstacle 40. This region is referred to herein as the "sensor region".

In order to detect whether there is an obstacle 40 within the obstacle detection map 70, the sensors 26, 28, 42, 44 are activated to transmit ultrasonic signals within the sensor region and to receive reflected signals from objects or obstacles within the range of the sensors. The outputs from the sensors 26, 28, 42, 44, or signals indicative thereof, are provided to the controller 16. On the basis of the sensor signals (or absence of any reflected signals in regions where there are no obstacles) the processor creates the obstacle detection map 70 identifying the location of any obstacles in the sensor region, such as obstacle 40.

Figure 4:
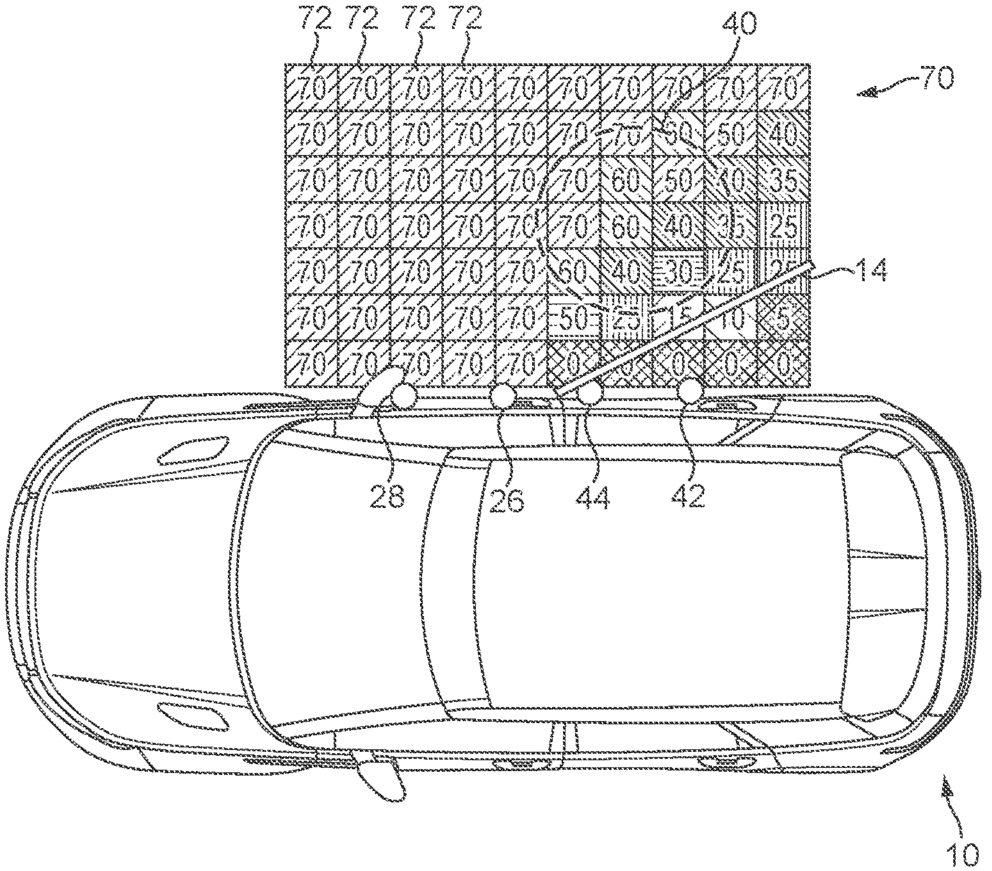
FIG. 4 shows a plan view of the vehicle in FIGS. 1 and 2, to illustrate a projected door sweep region overlaid on a two dimensional map of a region in the vicinity of the vehicle.

It will be appreciated that multiple obstacles may be detected within the obstacle detection map 70 and that FIG. 4 shows only an obstacle closest to the door, for simplicity.

The controller generates an output signal in the form of a maximum door opening angle MA value (as in FIG. 2) which corresponds to a degree of door opening, of limited extent, which would permit at least partial opening of the door but could still prevent a clash occurring between the door and the obstacle. The output signal is utilised to control further door movement accordingly to prevent a clash occurring between the door and the obstacle.

Once the door drive signal is initiated, the door sweep trajectory and the corresponding maximum projected door sweep region (as described previously) are determined from the controller memory. The controller 16 overlays the projected door sweep region and the obstacle detection map 70 and looks for a correspondence between the location of the obstacle in the obstacle detection map 70 and the projected door sweep region. If there is a correspondence between the obstacle and the maximum projected door sweep region (i.e. when the door would be in its fully open position according to the door drive profile), an output signal is generated to indicate that a clash will occur if the door continues on its expected path. In other words, if it is determined that the location of the object would fall within the projected door sweep region as the door follows its door trajectory to the final door-open position, an output signal is generated to indicate that a clash will occur if the door continues on its expected path.

The obstacle detection map 70 is defined by a two dimensional array of squares or array elements 72 (four of which are identified). In the illustration shown in FIG. 4, the obstacle detection map 70 includes seven array elements arranged on the y-axis and ten array elements arranged on the x-axis to give a map having seventy array elements. It will be appreciated that the number of array elements shown in FIG. 4 is arbitrary and any number of array elements may form the map. Typically, to ensure a greater accuracy of door position and control, there may be up to 10,000 array elements (100×100) forming the map. Such a 10,000 element array is capable of achieving a door angle resolution of approximately 1 degree.

Each of the array elements has an associated angle value. For example, in the illustration shown the door 14 is shown in a position in which it extends through a series of the array elements ranging from 0 to 20 degrees and the obstacle resides within array elements having a range of angular values between 15 and 70 degrees, where 70 degrees represents the maximum extent of opening of the door. The angle values within the array elements covered by the obstacle correspond to a maximum door opening angle MA when the door is at a distance, Do, to the detected obstacle 40.

It will be appreciated that a different maximum door opening angle than 70 degrees may be used, depending on the vehicle set up.

If an imminent clash is detected between the door and the obstacle 40, the maximum door opening angle MA is determined by selecting the minimum angle value of the array elements in which the obstacle is detected. So, for example, in FIG. 4, the maximum door opening angle is determined to be 15 degrees. The maximum door opening angle MA is then used to limit the extent of opening of the door 14 to 15 degrees, so as to ensure that the door doesn't clash with the obstacle which has been detected.

The maximum door opening angle MA is determined from the array on the basis of the obstacle position in the obstacle detection map and the minimum distance-to-obstacle value, Do, as described previously. The maximum door opening angle MA is fed back to the controller and the drive profile is then updated so as to limit the extent of door opening to an initial portion of the door trajectory only, thereby preventing a door clash with the obstacle. In this way, the output signal is therefore used to limit door opening so as to prevent a clash between the door and the obstacle.

If no correspondence is detected between the maximum projected door sweep region and the location of the obstacle 40 in the obstacle detection map (i.e. there is no obstacle within the projected door sweep region for the door when in its final position), door opening movement is initiated.

As the door moves along its trajectory, the obstacle detection map is updated as the sensor signals continue to monitor the sensor region and there is a repeated check of the overlay between the projected door sweep region and the obstacle detection map to check for an imminent clash between the moving door and any new or moving obstacle moving into the path of the door. In the event that a correspondence is identified between the projected door sweep region and the location of an obstacle when the door is moving, an output signal is generated as described above and further door movement is modified or terminated accordingly.

In response to an output signal being generated when a correspondence is determined between the maximum projected door sweep region and an obstacle location, one or more of the following steps may be taken.

In a first embodiment, as discussed above, the door profile may be adjusted in response to the output signal so that door movement is inhibited (if not already started) or stopped automatically part-way along its path and prior to a clash occurring with the detected obstacle. Referring back to FIG. 2, it is desirable for door movement to be halted a short distance before a clash occurs with the obstacle, as identified by the separation distance Do. This is because it may still be possible for a user of the vehicle to gain access to, or leave, the vehicle if the door is opened to some extent, even if door opening movement is halted before the door reaches its maximum position.

In another embodiment, door opening movement may be damped before it comes to a halt. In other words, when an output signal is generated to indicate a correspondence between the projected door sweep region and the obstacle location, a damping signal is provided to the power door unit 16 which adjusts the drive profile for the door so as to damp or reduce the speed and/or acceleration and/or deceleration of the opening movement of the door 12, 14, just prior to the point at which the door would clash with the obstacle and the door comes to a halt. This provides a more sophisticated feel for the user and prevents jarring or jolting of the door 12, 14 as it comes to a halt, which may cause surprise to the user.

In another embodiment, in the event that an obstacle is detected within the obstacle detection map, the output signal may be used to halt the opening of the door altogether, prior to door opening, rather than limiting the extent of door opening.

As the invention is equally applicable to controlling closing movement of the door, the obstacle detection map 70 may comprise an array of elements which represents the maximum closing angles for the door which would permit at least partial closing of the door in the event that an obstacle is detected within the obstacle detection map 70. In the same way as for opening the door, the resultant output signal is utilised to control further door movement accordingly so as to prevent a clash occurring between the closing door and the obstacle, dependent on the maximum door closing angle.

If the vehicle is provided with corner radar sensors 34, 36, these may be used to characterise the nature of any obstacle or obstacles which are identified within the obstacle detection map by the sensors 26, 28, 42, 44. Typically radar corner sensors 34, 36 on a vehicle are used when the vehicle is moving (for example, for the purpose of blind spot monitoring). However, in the present embodiment the corner radar sensors 34, 36 may be additionally used for the purpose of obstacle classification when the vehicle is stationary.

In any embodiment of the invention, the output signal may be used to initiate an alert to the driver (i.e. a clash output signal) that door opening is being damped and/or stopped because of obstacle detection. The driver alert may come in the form of an audible signal, haptic signal or a visual alert. The visual alert may conveniently be provided on the door itself, which is immediately in the field of view of the driver exiting the vehicle, or may be provided elsewhere in the vehicle.

Because the sensors 26, 28 42, 44 are mounted on the doors 12, 14 themselves, the sensors move as the respective door is opened and this requires a continuous updating of the angles of the array elements of the obstacle detection map 70 as the door continues along its path. This continuous updating can be computationally expensive. The moving of the sensors can also introduce noise or interference into the signals which are output from the sensors. Both factors may affect the quality of the output signal, both separately or in combination.

In order to improve the detection of obstacles, and to compensate for some of the difficulties of using the sensor signals from moving door sensors, a sector method may be implemented, in addition to the aforementioned angle-based method, as discussed below with reference to FIG. 5. The following method may be implemented in particular to overcome potential difficulties of using the angle-based method when the door is moving.

Figure 5:
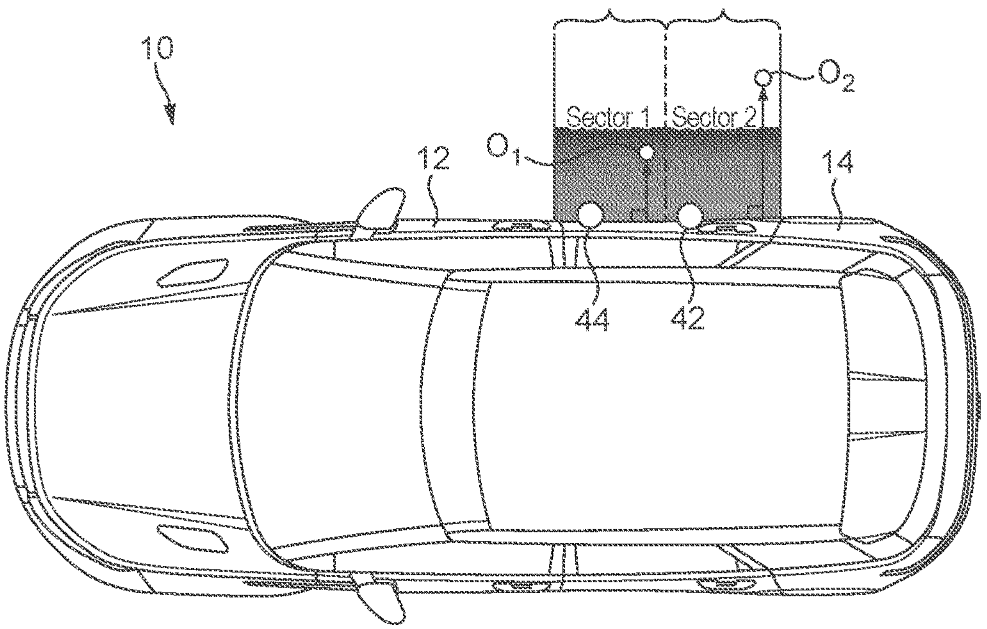
FIG. 5 shows a plan view of the vehicle in FIG. 1, to illustrate a sector method of detecting an obstacle in the vicinity of the vehicle.

Referring to FIG. 5, the sensor region in the vicinity of the vehicle 10 is divided in the power door controller 16 into two sectors, Sector1 and Sector2. Sector 1 is associated with a front region of the rear door 14 and Sector2 is associated with a rear region of the rear door 14. In FIG. 5, by way of example, two obstacles O1 and O2 are located in the region in the vicinity of the vehicle, one in Sector1 (O1) which is located relatively close to the vehicle 10 and one in Sector2 (O2) which is located relative far away from the vehicle 10.

The sensors 42, 44 mounted to the vehicle door 10 are used to detect the presence of the objects, O1 and O2, as described above and a determination is made of the perpendicular distance from each obstacle, O1 and O2, to the vehicle door (i.e. perpendicular to the vertical plane of the vehicle door) for each sector. The perpendicular distance which has been determined is than used to limit the extent of door opening in each sector, as opposed to using a maximum door opening angle (as in FIG. 4). In practice this sector-based obstacle detection method may be used in combination with the angle-based method of FIG. 4 to address the complications which may be encountered in using sensor measurements only from moving door sensors in an angle-based method. In one embodiment, for example, the angle-based method may be used prior to door opening movement and the sector-based method may be used once the door is moving. Alternatively, both methods may be used together so that the sector-based method provides a check on the angle based method.

Figure 6:
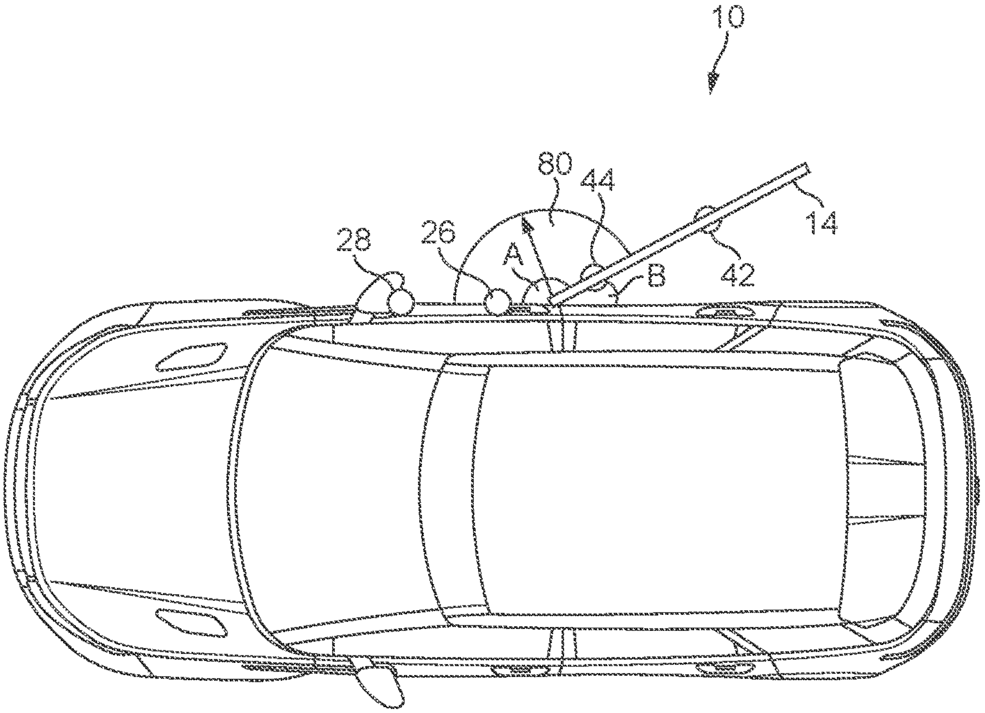
FIG. 6 shows a plan view of the vehicle in FIG. 1 to illustrate a user-proximity check region associated with a door sweep trajectory.

The aforementioned example is concerned with opening of the door to avoid an obstacle that resides within a projected door sweep region defined outwardly of the opening door, between the opening door and the side of the vehicle. Referring to FIG. 6, in another embodiment of the invention, the controller is configured to determine the presence of an obstacle in a user proximity check region 80 (which in this case defines the projected door sweep region). The user proximity check region 80 resides outward of the door 14 in a region adjacent to the vehicle 10. The projected door sweep region, which defines the user proximity check region, is thus outward of the door 14 and is defined by an obtuse angle A relative to the side of the vehicle. The extent of the obtuse angle A is determined by the acute angle B of opening of the door 14 relative to the vehicle body, with the sum of angles A and B being equal to 180 degrees. The extent of the user proximity check region 80 is therefore defined by the door drive profile initiated by the user instruction.

Prior to door closing being initiated, a check is made as to whether an obstacle resides within the user proximity check region 80, as described previously with reference to the previous Figures. If a correspondence exists between the user proximity check region 80 and the obstacle position (not shown in FIG. 6), an output signal is generated to identify that an obstacle may become trapped at the front edge of the rear door, adjacent to the hinge, if door movement is continued. The output signal may be used to halt door movement, to damp door movement or to initiate a routine in processing whereby a maximum angle is determined for door closing (in a similar way to that described with reference to FIG. 4). This latter process comprises creating an obstacle detection map in the user proximity check region (as described with reference to FIG. 4), together with the two-dimensional array of angle values, and determining the maximum angle through which the door may be closed, from the open position moving towards the closed position, dependent on the position of the detected object. In this way door movement can continued, even if an obstacle is detected, but it is prevented from proceeding to a point beyond a certain angle.

The method may also be applied to the front edge of the front door, albeit requiring the use of additional appropriately mounted ultrasonic detectors in the proximity of the front door hinge.

In addition to using the sensor signals to locate objects within the user proximity check region 80 before the door is opened, further checks may continue as the door moves through its trajectory. In this case it may be beneficial to use the sector method described in FIG. 5.

It is a particular aspect of looking for the presence of objects in the user proximity check region 80 to determine when any part of a person (for example a person's hand) is in the vicinity of the door hinge. To this end, a determination is made regarding whether any detected objects within the user proximity check region are moving within the region. The sensor output signals are therefore used to locate objects in the user proximity check region, as described previously, and the position of any object is also monitored as a function of time to identify object movement. The identification of a moving object in the user proximity check region 80 may be interpreted as an indication that a person is in the vicinity of the moving door, and the hinge of the door, and hence this may immediately result in the halting of door movement.

As mentioned previously, in determining the appropriate drive profile following the detection of a correspondence between an obstacle and the projected door sweep region, the controller takes account of the pitch and roll angle of the vehicle, as determined by the roll sensor, together with the door mass. The pitch and roll angles are utilised to ensure the door can be maintain in an open position, with no further door movement, even when the vehicle is at an angle of roll or pitch relative to the longitudinal and transverse axes of the vehicle, respectively. For example, this may require the braking force on the actuator for the door to be increased for higher angles of roll and pitch so as to ensure that the door doesn't close inadvertently against a user exiting through the open door.

It will be appreciated that, when opening the door, the force required to open the door may depend on the pitch and/or roll angle of the vehicle.

In other embodiments of the invention to those described previously, the power door system may be incorporated within a door mechanism which does not only allowed for automatic door operation in response to a user request, but which provides a power assisted door opening movement initiated by a user operating the door handle. Door opening may be initiated by a user of the vehicle activating the internal door handle and/or applying a force to the door to initiate opening movement. Once door opening is initiated, the power door unit 16 serves to drive door opening movement so as to reduce the burden on the user in applying a force to open the door. For example, the door may be provided with a gyro and an accelerometer which are used to detect when a user provides force to the door. The applied force is then used to calculate the level of motor assistance required to assist with door opening.

If a correspondence is detected between the projected door sweep region and the obstacle position, the power drive unit 16 initiates a resistance force at a corresponding point along the door trajectory to increase the force of resistance experienced by the user in trying to apply force to further open the door. In this way the user is alerted to stop further opening of the door to avoid a clash with the obstacle.

It will be appreciated that in any of the aforementioned embodiments the processor may be configured so that an output signal, upon which further control of door moment is based, is generated when there is no correspondence between the projected door trajectory region and the obstacle location, rather than when there is an overlap, and that subsequent door control is just programmed accordingly.

It will also be appreciated that some of the methods described previously are applicable to door closing, as well as door opening, even if they have been described in the context of door opening.

It will further be appreciated that any reference within the description to the first and second positions between which door movement occurs may refer to fully open and fully closed positions for the door, respectively, or vice versa, but also need not be references to the extremes of door position (i.e. the closed position or the fully open position), but may be any positions intermediate these points.

It is to be understood that the power door controller referred to in this document can comprise a control unit or computational device having one or more electronic processors (e.g., a microprocessor, a microcontroller, an application specific integrated circuit (ASIC), etc.), and may comprise a single control unit or computational device, or alternatively different functions of the controller may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller to implement the control techniques described herein (including some or all of the functionality required for the method described herein). The set of instructions could be embedded in said one or more electronic processors of the controller; or alternatively, the set of instructions could be provided as software to be executed in the controller. A first controller or control unit may be implemented in software run on one or more processors. One or more other controllers or control units may be implemented in software run on one or more processors, optionally the same one or more processors as the first controller or control unit. Other arrangements are also useful.

In the example illustrated the Figures, the power door controller comprises at least one electronic processor having one or more electrical input(s) for receiving one or more (input signal(s)), and one or more electrical output(s) for outputting one or more (output signal(s)). The or each controller further comprises at least one memory device electrically coupled to the at least one electronic processor and having instructions stored therein. The at least one electronic processor is configured to access the at least one memory device and execute the instructions thereon.

The, or each, electronic processor may comprise any suitable electronic processor (e.g., a microprocessor, a microcontroller, an ASIC, etc.) that is configured to execute electronic instructions. The, or each, electronic memory device may comprise any suitable memory device and may store a variety of data, information, threshold value(s), lookup tables or other data structures, and/or instructions therein or thereon. In an embodiment, the memory device has information and instructions for software, firmware, programs, algorithms, scripts, applications, etc. stored therein or thereon that may govern all or part of the methodology described herein. The processor, or each, electronic processor may access the memory device and execute and/or use that or those instructions and information to carry out or perform some or all of the functionality and methodology described herein.

The at least one memory device may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers have been described comprising at least one electronic processor configured to execute electronic instructions stored within at least one memory device, which when executed causes the electronic processor(s) to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

It will be appreciated that various changes and modifications can be made to the present invention without departing from the scope of the present application.

The invention claimed is:

1. A control system for controlling movement of a door of a vehicle along a door sweep trajectory between a first position and a second position, the control system comprising one or more controllers, the control system comprising:

an electrical input configured to receive a sensor signal; and an electronic processor configured to:

based on the sensor signal, generate an obstacle detection map of a sensor region in a vicinity of the vehicle, the sensor region adjacent to a side of the door and the obstacle detection map comprising a location of a detected obstacle in the sensor region, wherein the obstacle detection map is defined by an array of elements;

determine an overlap of the obstacle detection map and a projected door sweep region defined by the door sweep trajectory;

assign a respective angle value to each array element corresponding to the projected door sweep region, wherein in an area of the obstacle detection map corresponding to the location of the detected obstacle, each angle value of each array element in the area corresponds to a maximum door opening angle when the door is at a threshold distance to the detected obstacle;

generate an output signal based on the obstacle detection map, wherein the output signal is a selected angle value of the obstacle detection map that is the minimum angle value of the obstacle detection map in the area of the obstacle detection map corresponding to the location of the detected obstacle; and control movement of the door based on the output signal, wherein the sensor signal is received from one or more sensors mounted on the door, and wherein the angle values of the array elements are updated as the door moves along the door sweep trajectory.

2. The control system of claim 1, wherein each maximum door opening angle is determined on the basis of a minimum distance-to-obstacle value.

3. The control system of claim 1, wherein controlling movement of the door based on the output signal comprises stopping the door if the obstacle is detected in the door sweep region defined by the door sweep trajectory.

4. The control system of claim 1, wherein the obstacle detection map identifies the location of the detected obstacle in the sensor region based on reflected signals from the object in the sensor region.

5. The control system of claim 1, wherein the electronic processor is further configured to provide the output signal prior to the door being moved from the first position towards the second position.

6. The control system of claim 1, wherein the output signal serves to limit an extent of the movement of the door based on the location of the obstacle and the output signal, and wherein the array of elements is arranged into a grid, the grid including rows and columns of array elements of the array.

7. The control system of claim 6, wherein the electronic processor is further configured to output a damping signal to increase a level of damping of the door as the door approaches the location of the obstacle.

8. The control system of claim 1, wherein the sensor signal comprises information representative of a pitch angle and/or roll angle of the vehicle.

9. The control system of claim 8, wherein the electronic processor is further configured to generate the output signal to control a force required to hold the door in a fixed position based on the pitch angle and/or roll of the vehicle.

10. A vehicle comprising at least one door and the control system of claim 1 for controlling movement of the at least one door along the door sweep trajectory, the vehicle comprising:

a sensor assembly comprising the one or more sensors, operatively coupled to the control system for providing the sensor signal thereto, and at least one door actuator, operatively coupled to the control system for controlling movement of the door based on the output signal.

11. The vehicle of claim 10, wherein the one or more sensors of the sensor assembly comprise at least two door sensors, mounted to the door, wherein the at least two door sensors are ultrasonic sensors mounted within a trim panel of the door, and wherein the trim panel is a plastic strip mounted at a lower edge of the door.

12. The vehicle of claim 10, wherein the sensor assembly further comprises at least one corner sensor mounted on at least one of a front corner and a rear corner of the vehicle.

13. The vehicle as claimed in claim 12, wherein the at least one corner sensor is a radar sensor configured to generate an output for characterisation of the obstacle within the obstacle detection map.

14. A method for, in a vehicle, a control system controlling movement of a door of the vehicle along a door sweep trajectory between a first position and a second position, the control system comprising one or more controllers, the method comprising:

receiving a sensor signal by an electrical input;

based on the sensor signal, generating, by an electronic processor, an obstacle detection map of a sensor region in a vicinity of the vehicle, the sensor region adjacent to a side of the door and the obstacle detection map comprising a location of an obstacle in the sensor region, wherein the obstacle detection map is defined by an array of elements;

determining, by the electronic processor, an overlap of the obstacle detection map and a projected door sweep region defined by the door sweep trajectory;

assigning, by the electronic processor, an angle value to each array element corresponding to the projected door sweep region, wherein in an area of the obstacle detection map corresponding to the location of the obstacle, each angle value of each array element in the area corresponds to a maximum door opening angle when the door is at a threshold distance to the obstacle;

generating, by the electronic processor, an output signal based on the obstacle detection map, wherein the output signal is a selected angle value of the obstacle detection map that is the minimum angle value of the obstacle detection map in the area of the obstacle detection map corresponding to the location of the detected obstacle; and controlling movement of the door based on the output signal, wherein the sensor signal is received from one or more sensors mounted on the door, and wherein the angle values of the array elements are updated as the door moves along the door sweep trajectory.

15. A non-transitory, computer-readable storage medium storing instructions thereon that, when executed by one or more electronic processors, causes the one or more electronic processors to carry out the method of claim 14.

* * * * *